United States Patent
Fujita

(10) Patent No.: US 8,884,991 B2
(45) Date of Patent: Nov. 11, 2014

(54) CONTROL SYSTEM, CONTROL APPARATUS, HANDHELD APPARATUS, CONTROL METHOD, AND PROGRAM

(75) Inventor: Takuya Fujita, Kanagawa (JP)

(73) Assignee: Sony Corporation, Tokyo (JP)

( * ) Notice: Subject to any disclaimer, the term of this patent is extended or adjusted under 35 U.S.C. 154(b) by 650 days.

(21) Appl. No.: 13/089,785

(22) Filed: Apr. 19, 2011

(65) Prior Publication Data

US 2011/0298831 A1 Dec. 8, 2011

(30) Foreign Application Priority Data

Jun. 3, 2010 (JP) ................................. 2010-127513

(51) Int. Cl.
| | |
|---|---|
| G09G 5/00 | (2006.01) |
| G06F 3/033 | (2013.01) |
| G06F 3/03 | (2006.01) |
| H04N 21/422 | (2011.01) |
| G06F 3/0481 | (2013.01) |
| H04N 5/44 | (2011.01) |
| G06F 3/0346 | (2013.01) |
| H04N 21/431 | (2011.01) |
| H04N 21/443 | (2011.01) |

(52) U.S. Cl.
CPC .......... *G06F 3/04817* (2013.01); *G06F 3/0325* (2013.01); *H04N 21/4222* (2013.01); *H04N 21/42222* (2013.01); *H04N 5/4403* (2013.01); *G06F 3/0346* (2013.01); *H04N 21/431* (2013.01); *H04N 21/4438* (2013.01)
USPC ........................................... 345/661; 345/157

(58) Field of Classification Search
CPC . G06F 3/0325; G06F 3/0346; G06F 3/04817; H04N 21/4222; H04N 21/42222; H04N 21/431; H04N 21/4438; H04N 5/4403
See application file for complete search history.

(56) References Cited

U.S. PATENT DOCUMENTS

| | | | |
|---|---|---|---|
| 5,453,758 A | | 9/1995 | Sato |
| 5,493,297 A | * | 2/1996 | Nguyen et al. ................ 341/118 |
| 5,757,358 A | * | 5/1998 | Osga .............................. 715/862 |
| 2001/0043265 A1 | * | 11/2001 | Tetterington et al. ........... 348/51 |
| 2004/0218056 A1 | * | 11/2004 | Nomura et al. ............ 348/208.6 |
| 2007/0157232 A1 | * | 7/2007 | Dunton et al. ................... 725/37 |
| 2010/0001953 A1 | * | 1/2010 | Yamamoto et al. ........... 345/158 |
| 2010/0188334 A1 | * | 7/2010 | Yamamoto et al. ........... 345/158 |

FOREIGN PATENT DOCUMENTS

JP 2001-56743 2/2001

* cited by examiner

*Primary Examiner* — Kee M Tung
*Assistant Examiner* — Sing-Wai Wu
(74) *Attorney, Agent, or Firm* — Oblon, Spivak, McClelland, Maier & Neustadt, L.L.P.

(57) ABSTRACT

A control system including: an input apparatus including a sensor portion; and a control apparatus including a coordinate generation portion that generates, based on a detection signal detected by the sensor portion, positional coordinates of a pointer on a screen, a selection area change portion that changes, in accordance with a level of a shake amount calculated based on the detection signal, a size of an icon selection area as an area where an icon on the screen is selected by the pointer, and a display control portion that controls display on the screen so that the pointer is displayed at a position corresponding to the positional coordinates of the pointer.

15 Claims, 11 Drawing Sheets

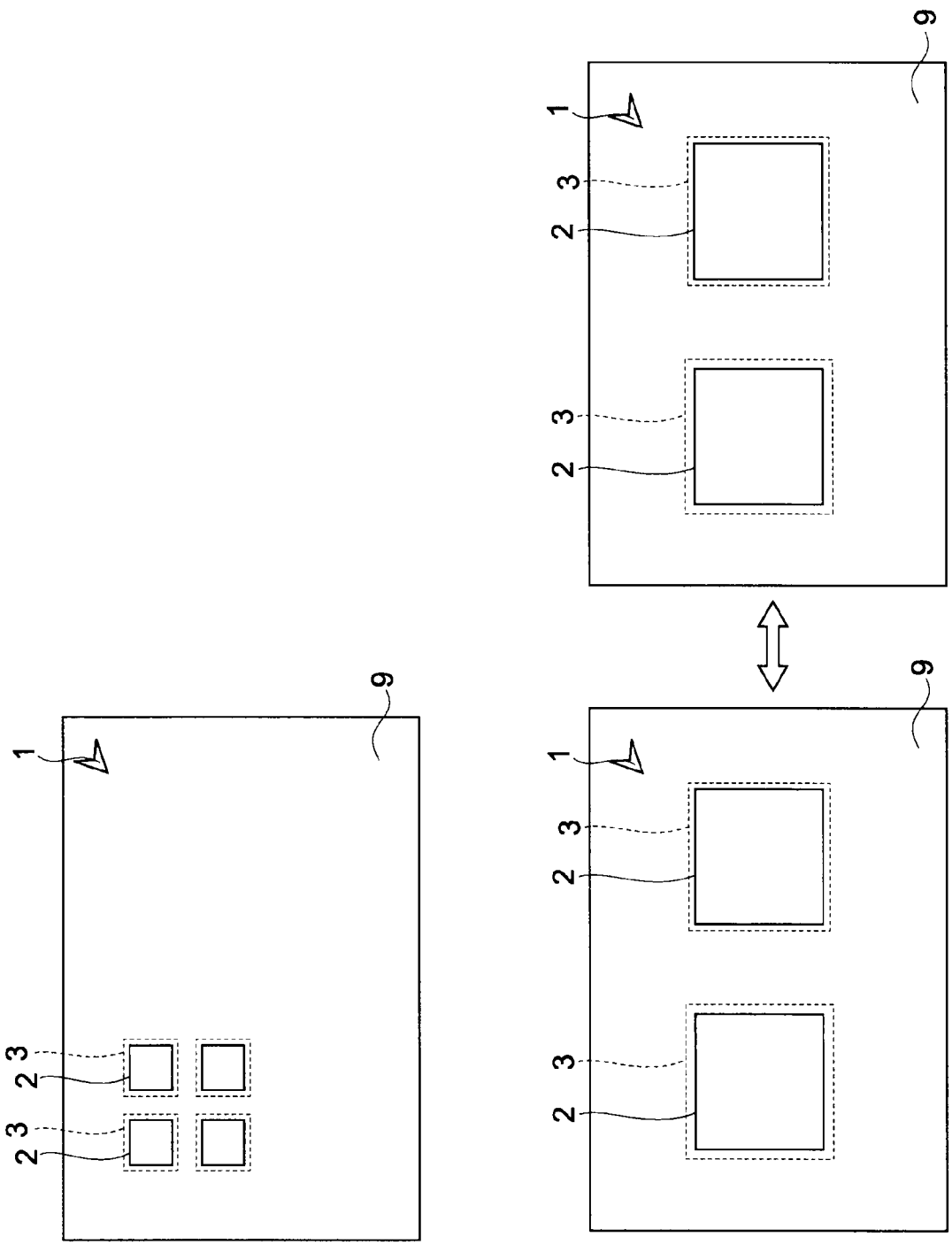

CONTROL SYSTEM, CONTROL APPARATUS, HANDHELD APPARATUS, CONTROL METHOD, AND PROGRAM

BACKGROUND OF THE INVENTION

1. Field of the Invention

The present invention relates to a technique involving a control system including a 3-dimensional operation input apparatus and a control apparatus that controls a movement of a pointer displayed on a screen in accordance with a movement of the input apparatus.

2. Description of the Related Art

Pointing devices, particularly a mouse and a touchpad, are used as controllers for GUIs widely used in PCs (Personal Computers). Not just as HIs (Human Interfaces) of PCs as in related art, the GUIs are now starting to be used as an interface for AV equipment and game devices used in living rooms etc. with, for example, televisions as image media. Various pointing devices that a user is capable of operating 3-dimensionally are proposed as controllers for the GUIs of this type (see, for example, Japanese Patent Application Laid-open No. 2001-56743).

SUMMARY OF THE INVENTION

When using the 3-dimensional operation input apparatus of this type, a user holds the input apparatus and operates it 3-dimensionally to move a pointer displayed on a screen. Then, the user moves the pointer to an icon displayed on the screen and presses an operation button or the like provided in the input apparatus to select the icon.

In the case of such a 3-dimensional operation input apparatus, a shake of a user may become a problem unlike input apparatuses such as a planar-operation-type mouse and a touchpad. Specifically, when the user moves the pointer to a target icon by operating the input apparatus 3-dimensionally, the shake of the user is reflected on the pointer movement. Consequently, a problem that it becomes difficult for the user to position the pointer on a target icon, with the result that the user becomes unable to easily select an icon occurs.

In view of the circumstances as described above, there is a need for a technique involving a control system that makes it possible for a user to easily select an icon even when a shake is caused.

According to an embodiment of the present invention, there is provided a control system including an input apparatus and a control apparatus.

The input apparatus includes a sensor portion.

The control apparatus includes a coordinate generation portion, a selection area change portion, and a display control portion.

The coordinate generation portion generates, based on a detection signal detected by the sensor portion, positional coordinates of a pointer on a screen.

The selection area change portion changes, in accordance with a level of a shake amount calculated based on the detection signal, a size of an icon selection area as an area where an icon on the screen is selected by the pointer.

The display control portion controls display on the screen so that the pointer is displayed at a position corresponding to the positional coordinates of the pointer.

In the control system, the size of the icon selection area is changed in accordance with the level of the shake amount. With this structure, even when a shake is caused, a target icon can be selected with ease.

The "sensor portion" may be constituted of a sensor having both the function as a coordinate sensor that outputs a detection signal for generating positional coordinates of a pointer and the function as a shake detection sensor that outputs a detection signal for calculating a level of a shake amount.

Examples of such a sensor having both functions include an image sensor that detects relative positions of the input apparatus and a display apparatus including a screen and a motion sensor that detects a movement of the input apparatus.

Alternatively, the coordinate sensor and the shake detection sensor may be constituted of different sensors. In this case, the "sensor portion" includes those sensors.

Examples of the coordinate sensor include an image sensor and a motion sensor.

The image sensor and the motion sensor may also be used as the shake detection sensor.

In the control system, the selection area change portion may change the size of the icon selection area at a predetermined timing.

In the control system, the selection area change portion may change the size of the icon selection area at one of a timing at which the pointer approaches the icon and a timing at which the pointer moves away from the icon.

With this structure, the size of the icon selection area can be changed at an appropriate timing.

In the control system, the control apparatus may further include a distance calculation portion and a distance judgment portion.

The distance calculation portion calculates a distance between the icon and the pointer based on the positional coordinates of the icon and the pointer.

The distance judgment portion judges whether the distance between the icon and the pointer is smaller than a comparative distance.

In this case, the selection area change portion may change the size of the icon selection area at one of a timing at which the distance between the icon and the pointer falls below the comparative distance from a state where the distance is equal to or larger than the comparative distance and a timing at which the distance becomes equal to or larger than the comparative distance from a state where the distance is below the comparative distance.

In the control system, the selection area change portion may change the size of the icon selection area every time the screen is drawn at least once at a refresh rate timing of the screen.

Also in this case, the size of the icon selection area can be changed at an appropriate timing.

In the control system, the input apparatus may include an operation portion.

In this case, the selection area change portion may change the size of the icon selection area at a timing at which a user instructs to change the size of the icon selection area via the operation portion.

Also in this case, the size of the icon selection area can be changed at an appropriate timing.

In the control system, the selection area change portion may change the size of the icon selection area at a timing at which a display structure on the screen changes.

Also in this case, the size of the icon selection area can be changed at an appropriate timing.

The expression "a display structure on the screen changes" refers to a case where all or a part of the display on the screen is switched, and the display on the screen before the switch and the display on the screen after the switch differ.

In the control system, the display control portion may display, in accordance with the change of the size of the icon selection area, an icon that is of a size corresponding to the icon selection area on the screen.

With this structure, the user is capable of visually recognizing that the size of the icon selection area has been changed.

In the control system, the display control portion may display an icon of a certain size on the screen irrespective of whether the size of the icon selection area is changed.

In this case, the control apparatus may further include a pointer position judgment portion that judges whether the positional coordinates of the pointer are within the icon selection area.

In this case, the display control portion may display the icon with an emphasis when the positional coordinates of the pointer are within the icon selection area.

In the control system, even when the size of the icon selection area is changed in accordance with the shake amount, the user cannot visually recognize that the size of the icon selection area has been changed. However, in the control system, when the pointer is within the selection area, the icon is displayed with an emphasis. As a result, also in the control system, the user can easily select a target icon.

In the control system, the control apparatus may further include a positional coordinate change portion that changes, when the size of the icon selection area is changed, the positional coordinates of the icon in accordance with the level of the shake amount.

With this structure, even when a distance between icons is small, at a time a large shake is caused, the icon selection area can be enlarged by expanding the distance between the icons. As a result, an icon selection by the user is additionally facilitated.

According to an embodiment of the present invention, there is provided a control apparatus controlling display on a screen based on a detection signal detected by a sensor portion of an input apparatus, including a coordinate generation portion, a selection area change portion, and a display control portion.

The coordinate generation portion is configured to generate, based on the detection signal, positional coordinates of a pointer on the screen.

The selection area change portion is configured to change, in accordance with a level of a shake amount calculated based on the detection signal, a size of an icon selection area as an area where an icon on the screen is selected by the pointer.

The display control portion is configured to control the display on the screen so that the pointer is displayed at a position corresponding to the positional coordinates of the pointer.

According to an embodiment of the present invention, there is provided a handheld apparatus including a display portion, a sensor portion, a coordinate generation portion, a selection area change portion, and a display control portion.

The display portion includes a screen.

The coordinate generation portion is configured to generate, based on a detection signal detected by the sensor portion, positional coordinates of a pointer on the screen.

The selection area change portion is configured to change, in accordance with a level of a shake amount calculated based on the detection signal, a size of an icon selection area as an area where an icon on the screen is selected by the pointer.

The display control portion is configured to control display on the screen so that the pointer is displayed at a position corresponding to the positional coordinates of the pointer.

The "sensor portion" may be constituted of a sensor having both the function as a coordinate sensor that outputs a detection signal for generating positional coordinates of a pointer and the function as a shake detection sensor that outputs a detection signal for calculating a level of a shake amount.

An example of such a sensor having both functions is a motion sensor that detects a movement of the handheld apparatus.

Alternatively, the coordinate sensor and the shake detection sensor may be constituted of different sensors. In this case, the "sensor portion" includes those sensors.

An example of the coordinate sensor is a motion sensor that detects a movement of the handheld apparatus. Moreover, as the coordinate sensor, various touch sensors that are used in touch panels of a resistance film type, a capacitance type, an electromagnetic induction type, an ultrasonic surface acoustic wave type, and an infrared operation type are used.

Examples of the shake detection sensor include an image sensor and a motion sensor.

According to an embodiment of the present invention, there is provided a control method including generating, based on a detection signal detected by a sensor portion, positional coordinates of a pointer on a screen.

In accordance with a level of a shake amount calculated based on the detection signal, a size of an icon selection area as an area where an icon on the screen is selected by the pointer is changed.

Display on the screen is controlled so that the pointer is displayed at a position corresponding to the positional coordinates of the pointer.

As described above, according to the embodiments of the present invention, the technique involving a control system that enables a user to easily select a target icon even when a shake is caused can be provided.

These and other objects, features and advantages of the present invention will become more apparent in light of the following detailed description of best mode embodiments thereof, as illustrated in the accompanying drawings.

BRIEF DESCRIPTION OF DRAWINGS

FIG. 14 are diagrams showing an example of a case where the positional coordinates of icons are changed in accordance with the change of the size of the icon selection area.

DESCRIPTION OF PREFERRED EMBODIMENTS

Hereinafter, embodiments of the present invention will be described with reference to the drawings.

First Embodiment

Overall Structure of Control System and Component Structures

Figure 1:
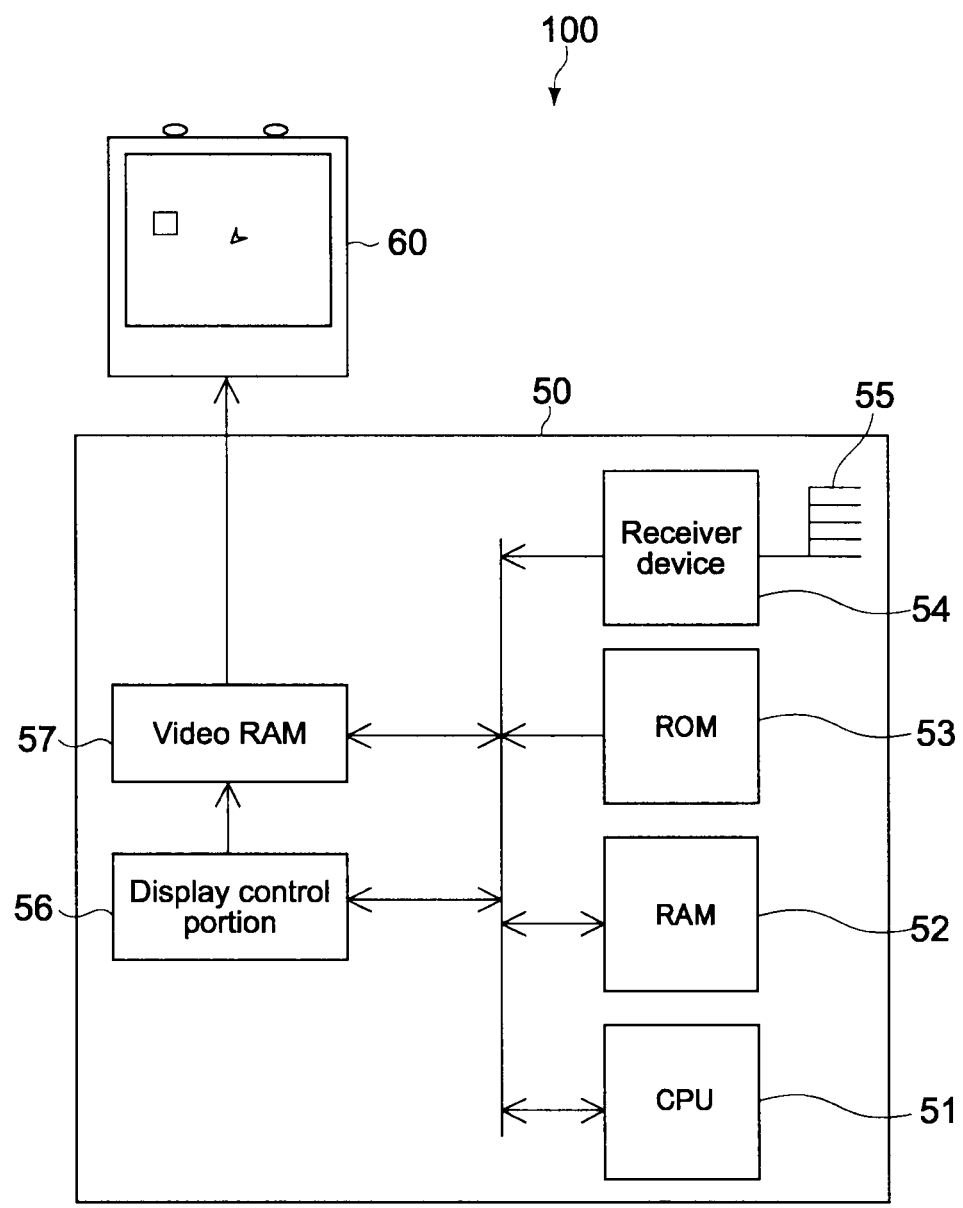
FIG. 1 is a diagram showing a control system according to an embodiment of the present invention.
Figure 1:
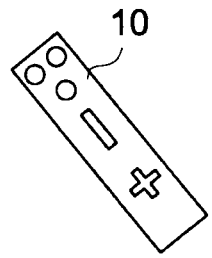

FIG. 1 is a diagram showing a control system according to a first embodiment of the present invention.

As shown in FIG. 1, a control system 100 includes an input apparatus 10, a control apparatus 50, and a display apparatus 60.

Figure 2:
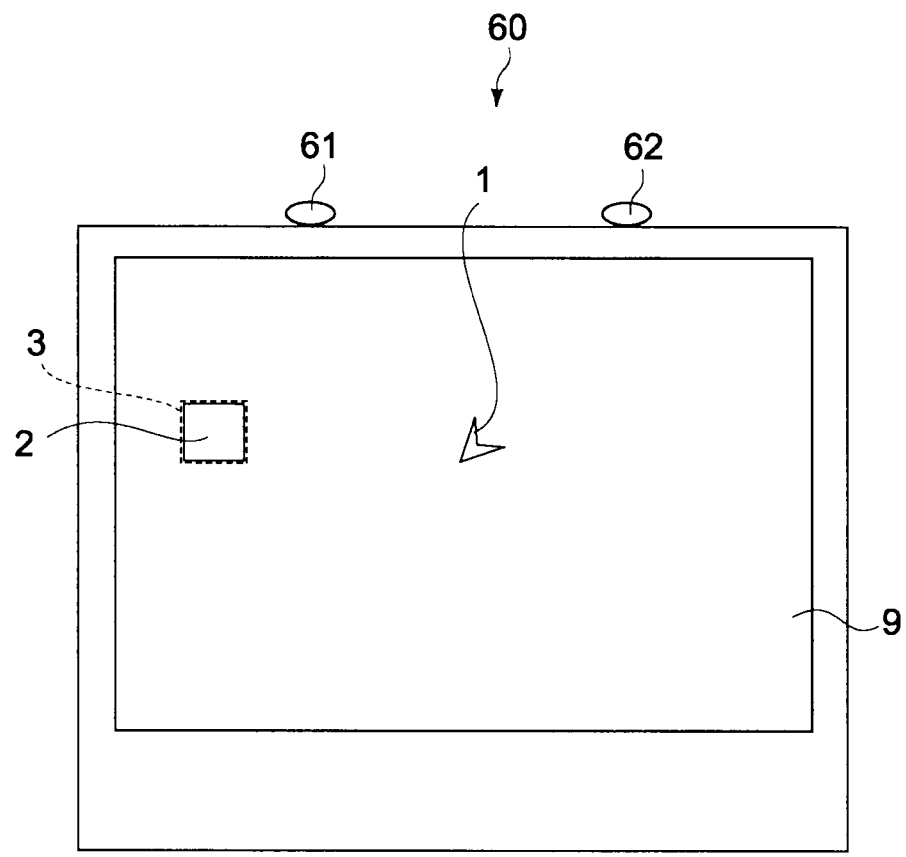
FIG. 2 is an enlarged diagram of a display apparatus.
Figure 2:
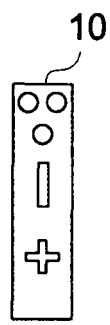

FIG. 2 is an enlarged diagram of the display apparatus 60.

The display apparatus 60 is constituted of, for example, a liquid crystal display or an EL (Electro-Luminescence) display. The display apparatus 60 may be an apparatus integrated with a display that is capable of receiving television broadcast and the like or an apparatus in which such a display and the control apparatus 50 are integrated.

At an upper portion of the display apparatus 60, two LED (Light Emitting Diode) modules 61 and 62 that output infrared rays are provided. It should be noted that the number of LED modules may be 3 or more and is not particularly limited.

On a screen 9 of the display apparatus 60, GUIs such as a pointer 1 and an icon 2 are displayed. The pointer 1 has a shape of an arrow, though not limited thereto. For example, the pointer 1 may have a shape of a simple circle, a polygon, a lens, or a hand, or may be a character icon.

It should be noted that the pointer 1 may not be temporarily displayed on the screen 9.

The icon 2 is an image on the screen 9 representing functions of programs, execution commands, file contents, and the like on a computer.

The icon 2 includes an icon selection area 3 (see broken like) as an area to be selected by the pointer 1. When the pointer 1 is within the icon selection area 3, the icon 2 can be selected. Details of the icon selection area will be given later.

Figure 3:
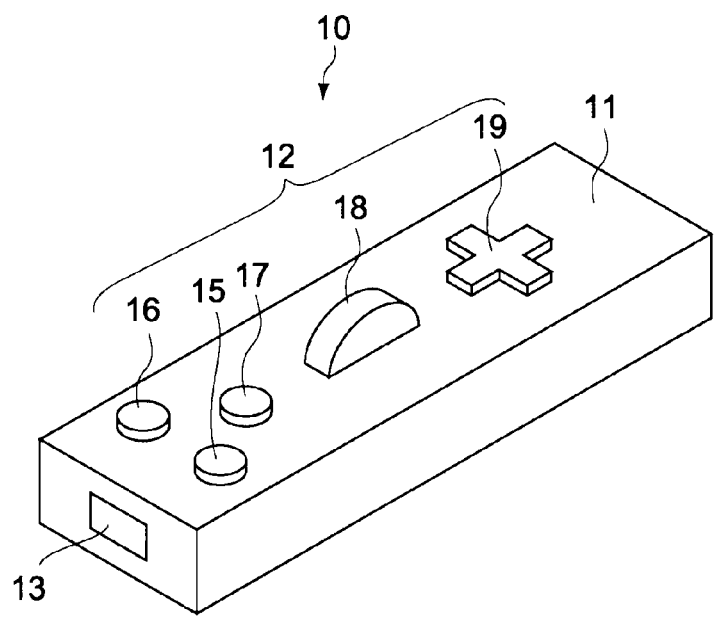
FIG. 3 is a perspective view of an input apparatus.

FIG. 3 is a perspective view of the input apparatus 10.

As shown in FIG. 3, the input apparatus 10 includes a casing 11, an operation portion 12 provided at an upper portion of the casing 11, and an infrared ray image pickup portion 13 provided at a tip end portion of the casing 11.

The casing 11 is elongated in one direction and is of a size that a user is capable of holding. The operation portion 12 includes press buttons 15 to 17, a rotary wheel button 18, and an arrow key 19.

The button 15 is allocated with a function corresponding to a left button of a planar-operation-type mouse (determination button) and the button 16 is allocated with a function corresponding to a right button of a mouse. In addition, the button 17 is allocated with various other functions that are not allocated to the buttons 15 and 16.

The wheel button 18 is allocated with a function of scrolling an image displayed on a screen.

The arrow key 19 is allocated with functions of, for example, advancing frames of still images displayed on the screen 9, fast-forwarding and rewinding moving images displayed on the screen 9, and changing channels of broadcast programs and the like.

It should be noted that the positions of the portions 15 to 19 provided in the operation portion 12 and the functions allocated thereto can be changed as appropriate.

Figure 4:
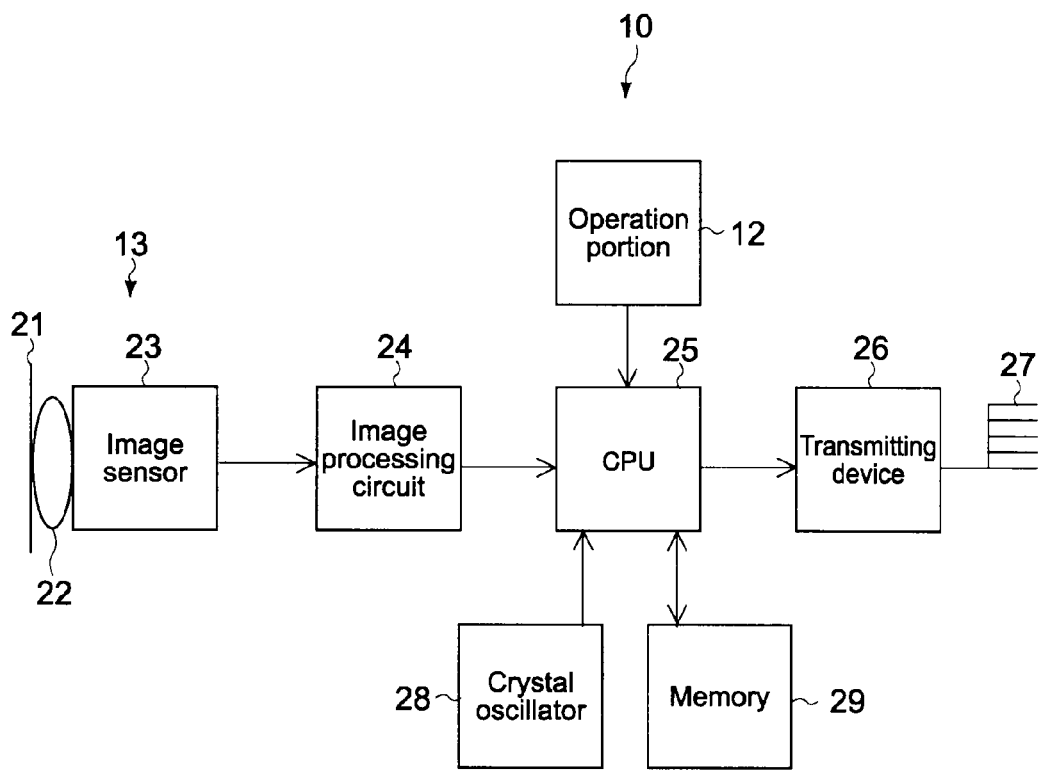
FIG. 4 is a block diagram showing an electrical structure of the input apparatus.

FIG. 4 is a block diagram showing an electrical structure of the input apparatus 10.

As shown in FIG. 4, the input apparatus 10 includes, in addition to the operation portion 12 and the infrared ray image pickup portion 13, an image processing circuit 24, a CPU (Central Processing Unit) 25, a memory 29, a transmitting device 26, an antenna 27, and a crystal oscillator 28. The image processing circuit 24, the CPU 25, the memory 29, the transmitting device 26, and the crystal oscillator 28 are mounted on a circuit board (not shown), and the antenna 27 is printed on the circuit board.

The infrared ray image pickup portion 13 includes an image sensor 23 such as a CCD (Charge Coupled Device) sensor and a CMOS (Complementary Metal-Oxide Semiconductor) sensor. The infrared ray image pickup portion 13 also includes a lens 22 provided in front of the image sensor 23 and an infrared ray filter 21 provided in front of the lens 22.

The image sensor 23 picks up infrared rays output from the LED modules 61 and 62 via the infrared ray filter 21 and the lens 22 and outputs the picked-up infrared image data to the image processing circuit 24.

It should be noted that in this embodiment, the image sensor 23 has both functions as a coordinate sensor that outputs a detection signal for generating positional coordinates of the pointer 1 and a shake detection sensor that outputs a detection signal for calculating a level of a shake amount.

The image processing circuit 24 processes the infrared image data output from the infrared ray image pickup portion 13, detects a high-luminance portion, and outputs it to the CPU 25.

The CPU 25 receives inputs of a signal output from the image processing circuit 24, an operation signal from the operation portion 12, and the like and executes various types of operational processing for generating predetermined control signals corresponding to the input signals.

The transmitting device 26 transmits the control signals generated by the CPU 25 to the control apparatus 50 via the antenna as an RF radio signal.

The memory 29 is a volatile and nonvolatile memory requisite for the processing of the input apparatus 10. The volatile memory is used as a working area of the CPU 25, and the nonvolatile memory stores various programs requisite for the processing of the input apparatus 10.

The crystal oscillator 28 generates reference clocks and supplies them to the CPU 25.

It should be noted that a dry cell battery, a rechargeable battery, and the like (not shown) are mounted inside the input apparatus 10, and power is supplied to the input apparatus 10 from the dry cell battery and the like.

Referring back to FIG. 1, the control apparatus 50 includes a CPU 51, a RAM (Random Access Memory) 52, a ROM (Read Only Memory) 53, a receiver device 54, an antenna 55, a display control portion 56, and a video RAM 57.

The receiver device 54 receives the control signals transmitted from the input apparatus 10 via the antenna 55. The CPU 51 analyzes the received control signals and executes various types of operational processing.

The RAM 52 is used as a working area of the CPU 51 and the like and temporarily stores various programs that are being executed and various types of data that are being processed.

The ROM 53 is a nonvolatile memory that stores various programs requisite for the processing of the control apparatus 50.

Under control of the CPU 51, the display control portion 56 generates image data to be displayed on the screen 9 of the display apparatus 60. The video RAM 57 serves as a working area of the display control portion 56 and temporarily stores the generated image data.

The control apparatus 50 may be an apparatus dedicated to the input apparatus 10, or may be a PC or the like. The control apparatus 50 may be a computer integrated with the display apparatus 60, audiovisual equipment, a game device, or the like.

It should be noted that although the CPU 51 and the display control portion 56 have been described as separate components in the descriptions on FIG. 1, the CPU 51 may have the function as the display control portion 56. Moreover, although the RAM 52 and the video RAM 57 have been described as separate components in the descriptions on FIG. 1, the RAM 52 may have the function as the video RAM 57.

(Description on Operation)
(Pointer Movement with Respect to 3-Dimensional Movement of Input Apparatus)

First, typical examples of a way of moving the input apparatus 10 and how the pointer 1 moves accordingly will be described.

A user holds the input apparatus 10 and aims a tip end side of the input apparatus 10 at the display apparatus 60. At this time, the infrared ray image pickup portion 13 provided at the tip end side of the input apparatus 10 faces the screen 9 of the display apparatus 60 and the two LED modules 61 and 62 provided above the screen 9.

The two LED modules 61 and 62 flicker at a predetermined cycle, and infrared rays are output from the LED modules 61 and 62 at a predetermined cycle. The image sensor 23 picks up the infrared rays output from the LED modules 61 and 62 via the infrared ray filter 21 and the lens 22 and outputs the picked-up infrared image data to the image processing circuit 24.

By processing the infrared image data output from the infrared ray image pickup portion 13, the image processing circuit 24 acquires positional information of a high-luminance point, and outputs the information to the CPU 25. The CPU 25 transmits the positional information of the high-luminance point acquired by the image processing circuit 24 to the control apparatus 50 via the transmitting device 26 and the antenna 27.

The CPU 51 of the control apparatus 50 receives the positional information of the high-luminance point via the antenna 55 and the receiver device 54. Based on the positional information of the high-luminance point, the CPU 51 generates positional coordinates of the pointer 1. The display control portion 56 controls display of the screen 9 so that the pointer 1 is displayed at the generated positional coordinates.

When the user holds the input apparatus 10 and moves it 3-dimensionally, positional information of a high-luminance point changes in accordance with the movement of the input apparatus 10. Using this relationship, the pointer moves on the screen. In the control system 100, the pointer 1 is displayed accurately at a position pointed by the tip end portion of the input apparatus 10.

(Change of Size of Icon Selection Area 3 Corresponding to Shake Amount)

Next, a change of a size of the icon selection area 3 that corresponds to a shake amount will be described.

Figure 5:
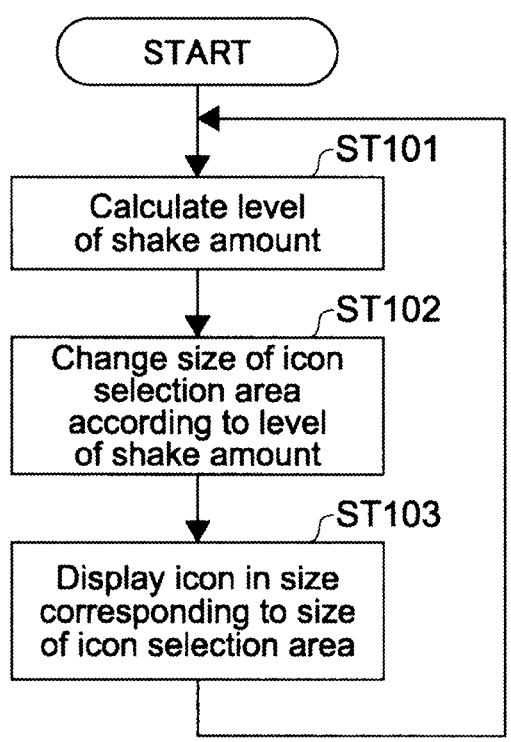
FIG. 5 is a flowchart showing processing of a control apparatus.

FIG. 5 is a flowchart showing processing of the control apparatus 50 according to the first embodiment.

Figure 6:
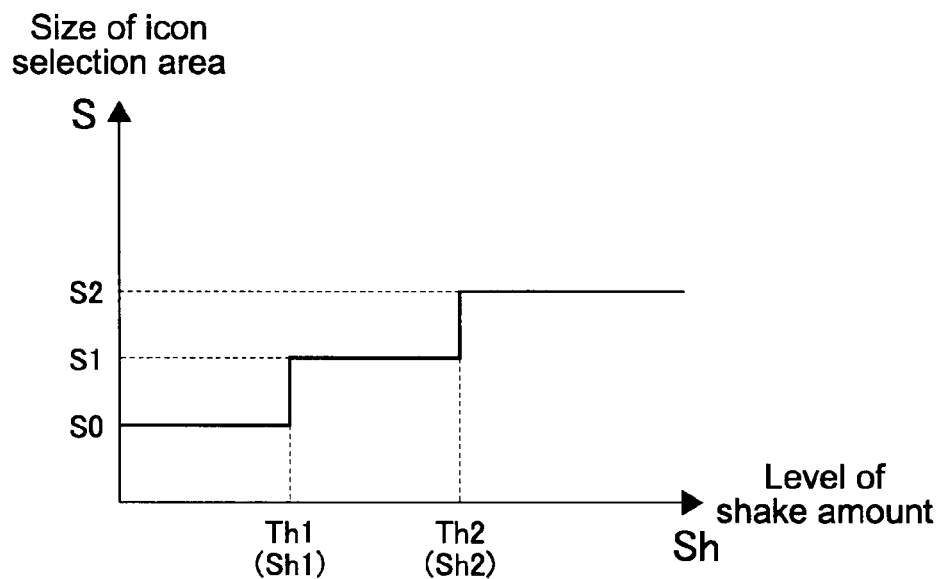
FIG. 6 is a diagram showing an example of a relationship between a level of a shake amount and a size of an icon selection area.

FIG. 6 is a diagram showing an example of a relationship between a level of a shake amount and a size of the icon selection area 3.

Figure 7:
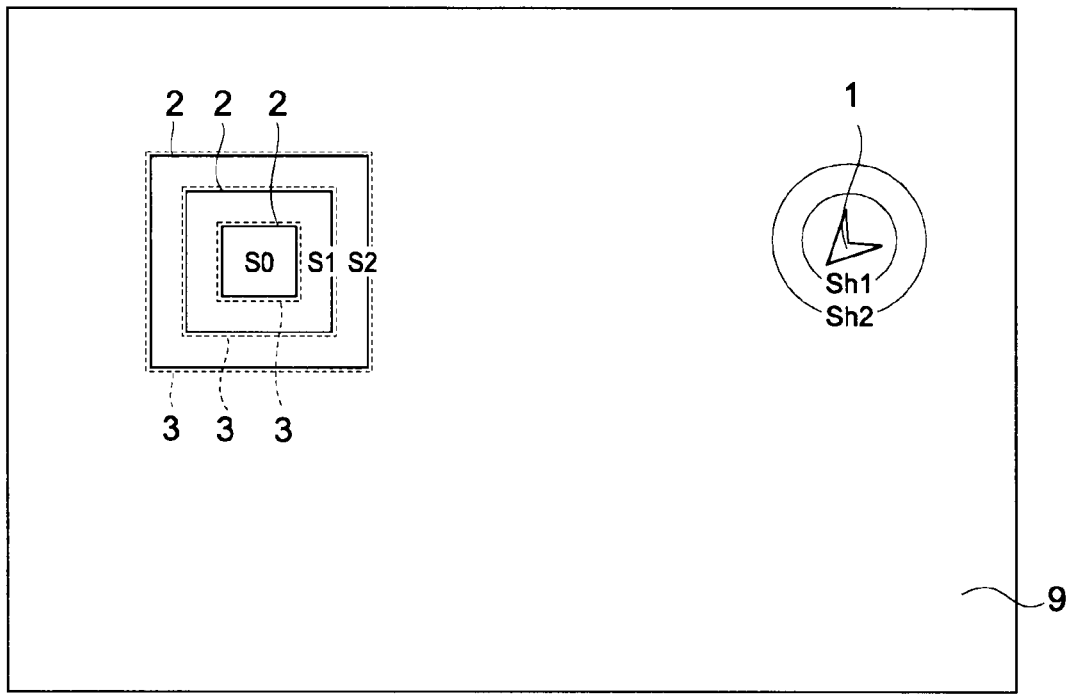
FIG. 7 is a diagram for explaining the relationship between the level of the shake amount and the size of the icon selection area, the diagram showing a display state on a screen in a case where the processing shown in FIG. 5 is executed.

FIG. 7 is a diagram for explaining the relationship between the level of the shake amount and the size of the icon selection area 3, the diagram showing a display state on the screen 9 in a case where the processing shown in FIG. 5 is executed.

In FIG. 7, sizes of the icon 2 that is actually displayed on the screen 9 are indicated by solid lines, and sizes of the icon selection area 3 are indicated by broken lines. Moreover, FIG. 7 schematically shows a state where the pointer 1 wobbles on the screen 9 in accordance with the level of the shake amount (Sh1, Sh2).

It should be noted that the icon selection area 3 is an area where the icon 2 becomes selectable by the pointer 1 as described above.

First, the CPU 51 of the control apparatus 50 calculates the size of the shake amount of the input apparatus 10 (casing 11) (Step 101). In this case, the CPU 51 acquires past information on a trajectory of the pointer 1 (e.g., about 0.5 sec to 1 sec) based on the positional coordinates of the pointer 1 acquired from the positional information of the high-luminance point and calculates the level of the shake amount of the input apparatus 10 based on the trajectory information.

Next, the CPU 51 of the control apparatus 50 changes the size of the icon selection area 3 based on the level of the shake amount (Step 102).

In this case, the CPU 51 compares the level of the shake amount with threshold values Th1 and Th2 as shown in FIG. 6 and when the size of the shake amount is smaller than the threshold value Th1, sets the size of the icon selection area 3 to S0. When the level of the shake amount is equal to or larger than the threshold value Th1 or smaller than the threshold value Th2, the CPU 51 sets the size of the icon selection area 3 to S1 and when the level of the shake amount is equal to or larger than the threshold value Th2, sets the size of the icon selection area 3 to S2.

After the size of the icon selection area 3 is changed, the display control portion 56 next controls display on the screen 9 so that an icon 2 of a size corresponding to the size of the icon selection area 3 is displayed (Step 103).

After the icon 2 of a size corresponding to the size of the icon selection area 3 is displayed, the CPU 51 returns to Step 101 and calculates the level of the shake amount of the input apparatus 10.

It should be noted that the processing of Steps 101 to 103 are executed every time the screen 9 is drawn once or a plurality of times (2 to 10 times) at a refresh rate (e.g., 50 times/sec, 100 times/sec) timing of the screen 9.

By the processing as described above, in this embodiment, the size of the icon selection area 3 increases stepwise as the level of the shake amount increases, and the size of the icon 2 displayed on the screen 9 also increases stepwise accordingly (see FIG. 7). As a result, in this embodiment, the icon selection area 3 and the icon 2 can be displayed in appropriate sizes that correspond to the level of the shake amount.

When the user selects a target icon 2, the user operates the input apparatus 10 3-dimensionally to position the pointer 1 on that icon 2 (icon selection area 3) and presses the button provided on the input apparatus 10. At this time, since the icon selection area 3 and the icon 2 are displayed in appropriate sizes that correspond to the level of the shake amount as described above, the user can easily select the target icon 2 even when a shake occurs.

Moreover, since the size of the icon 2 displayed on the screen 9 is changed into a size corresponding to the size of the icon selection area 3 when the size of the icon selection area 3 is changed in this embodiment, the user can visually recognize that the size of the icon selection area 3 has been changed with ease.

Further, since a change judgment timing (change timing) of the sizes of the icon selection area 3 and the icon 2 is a timing the screen 9 is drawn once or a plurality of times in this embodiment, a cycle of the change judgment timing is short. As a result, the level of the shake amount of the user can be appropriately reflected on the size of the icon selection area 3.

The above descriptions have been given on the case where the size of the icon selection area 3 increases stepwise as the level of the shake amount increases. However, the relationship between the level of the shake amount and the size of the icon selection area 3 is not limited thereto.

For example, the size of the icon selection area 3 may increase proportionally or exponentially as the level of the shake amount increases when the level of the shake amount exceeds a predetermined threshold value.

It should be noted that in the case of the first embodiment, when the size of the icon selection area 3 is changed, the size of the icon 2 displayed on the screen 9 also changes. In addition, the cycle of the change judgment timing of the icon selection area 3 is short. Therefore, when the size of the icon selection area 3 increases proportionally or exponentially, the size of the icon 2 displayed on the screen 9 is changed at a short cycle.

In this case, the size of the icon 2 increases and decreases at a short cycle, and visibility is impaired. Therefore, in a case where the size of the icon 2 displayed on the screen 9 is also changed when the size of the icon selection area 3 is changed, it is particularly effective to increase the size of the icon selection area 3 stepwise as the level of the shake amount increases as described above with reference to FIGS. 6, 7, and the like. In this case, since the size of the icon 2 displayed on the screen 9 hardly increases or decreases at a short cycle, it is possible to prevent visibility from being impaired.

Second Embodiment

Next, a second embodiment of the present invention will be described.

The second embodiment is different from the first embodiment above in that even when the size of the icon selection area 3 is changed, the size of the icon 2 displayed on the screen 9 is kept constant. Thus, that point will mainly be described.

It should be noted that in the descriptions on the second and subsequent embodiments, descriptions on parts having the same structures and functions as those of the first embodiment above are omitted or simplified.

Figure 8:
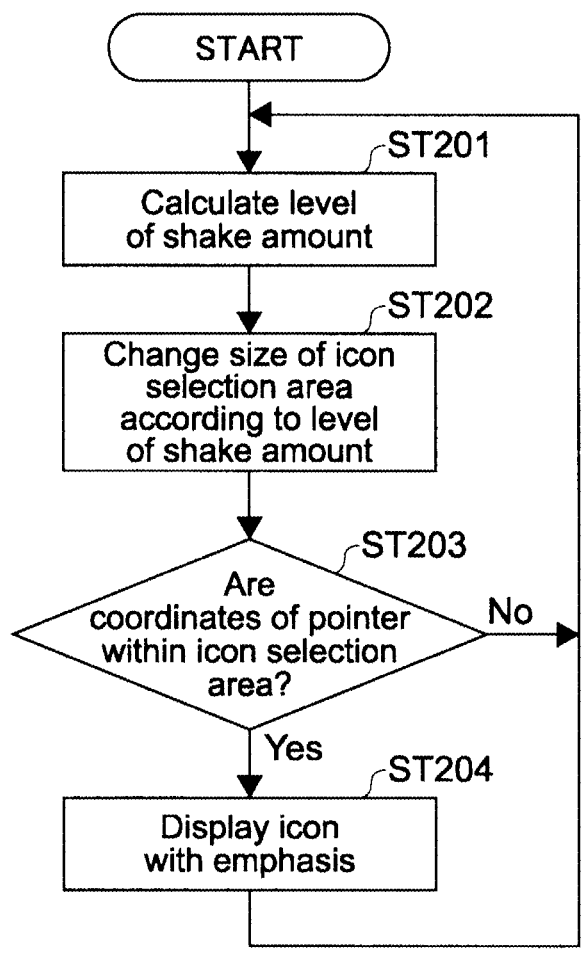
FIG. 8 is a flowchart showing processing of the control apparatus according to another embodiment of the present invention.

FIG. 8 is a flowchart showing processing of the control apparatus 50 according to the second embodiment.

Figure 9:
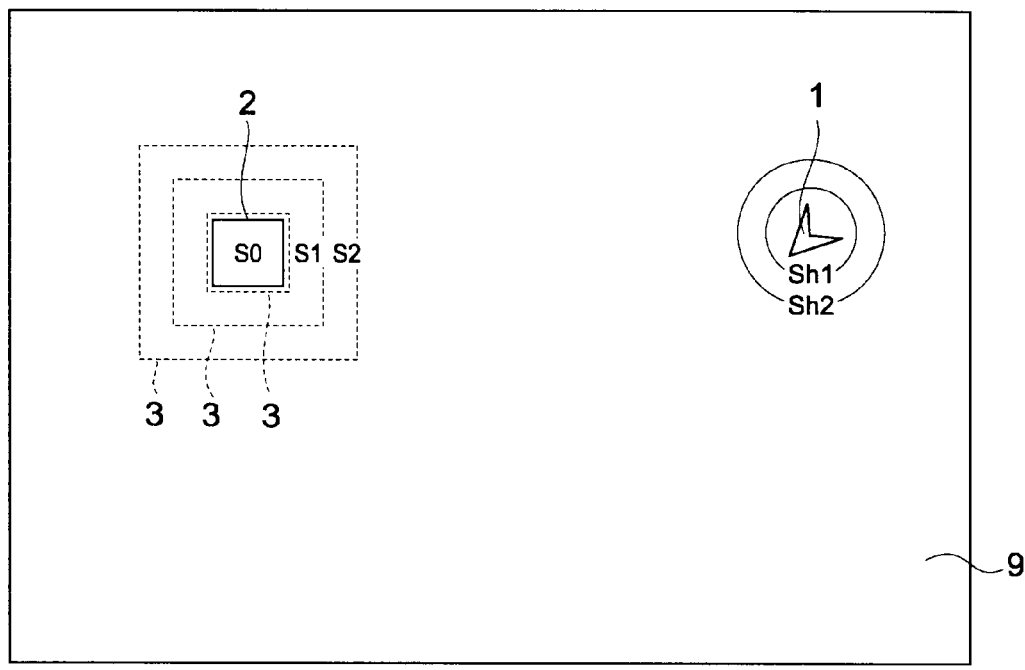
FIG. 9 is a diagram for explaining the relationship between the level of the shake amount and the size of the icon selection area, the diagram showing a display state on the screen in a case where the processing shown in FIG. 8 is executed.

FIG. 9 is a diagram for explaining the relationship between the level of the shake amount and the size of the icon selection area 3, the diagram showing a display state on the screen 9 in a case where the processing shown in FIG. 8 is executed.

In FIG. 9, the size of the icon 2 that is actually displayed on the screen 9 is indicated by a solid line, and sizes of the icon selection area 3 are indicated by broken lines. In addition, FIG. 9 schematically shows a state where the pointer 1 wobbles on the screen 9 in accordance with the levels of the shake amount (Sh1, Sh2).

Figure 10A:
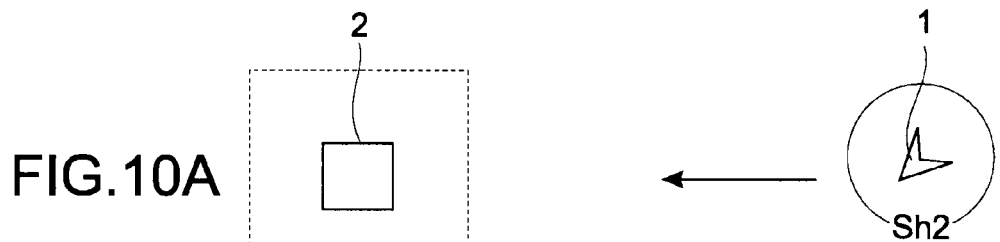
FIG. 10 are diagrams showing a state where an icon is displayed with an emphasis in accordance with a position of a pointer.

FIG. 10 are diagrams showing a state where an icon 2 is displayed with an emphasis in accordance with the position of the pointer 1.

First, the CPU 51 of the control apparatus 50 calculates the level of the shake amount of the input apparatus 10 (Step 201). The shake amount of the input apparatus 10 is calculated based on, for example, the past trajectories of the pointer 1 as described above.

Next, the CPU 51 changes the size of the icon selection area 3 based on the level of the shake amount (Step 202).

In this case, the CPU 51 changes the size of the icon selection area 3 so as to increase stepwise as the level of the shake amount increases as shown in FIG. 5. It should be noted that in the second embodiment, even when the size of the icon selection area 3 is changed, the size of the icon 2 displayed on the screen 9 is kept constant as shown in FIG. 9 unlike in the first embodiment.

Next, the CPU 51 judges whether the positional coordinates of the pointer 1 are within the icon selection area 3 (Step 203).

When the positional coordinates of the pointer 1 are not inside the icon selection area 3 (NO in Step 203) (see FIG. 10A), the CPU 51 returns to Step 201 and calculates the level of the shake amount again.

Figure 10B:
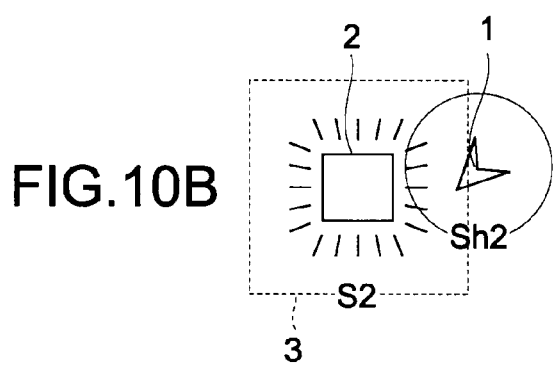

On the other hand, when the positional coordinates of the pointer 1 are within the icon selection area 3 (YES in Step 203), the display control portion 56 controls display on the screen 9 so that the icon 2 is displayed with an emphasis (Step 204) (see FIG. 10B).

It should be noted that although FIG. 10B shows a case where the pointer 1 is displayed on the screen 9 at a time the positional coordinates of the pointer 1 are within the icon selection area 3 and the icon 2 is thus displayed with an emphasis, the pointer 1 does not always need to be displayed.

Here, the display with an emphasis refers to, for example, light-up of the icon 2, flicker of the icon 2, a color change of the icon 2, display of a frame around the icon 2, and an expansion/contraction of the icon 2.

When the icon 2 is displayed with an emphasis, the CPU 51 returns to Step 201 and judges the level of the shake amount again. It should be noted that the processing of Steps 201 to 204 are executed every time the screen 9 is drawn once or a plurality of times (2 to 10 times) at a refresh rate (e.g., 50 times/sec, 100 times/sec) timing of the screen 9.

In the second embodiment, even when the size of the icon selection area 3 is changed in accordance with the level of the shake amount, the user cannot visually recognize the size of the icon selection area 3. However, when the pointer 1 is within the selection area, the icon 2 is displayed with an emphasis. Therefore, also in the second embodiment, the user can easily select the target icon 2.

Although the second embodiment has described a case where the size of the icon selection area 3 increases stepwise as the level of the shake amount increases, the size of the icon selection area 3 may change proportionally or exponentially.

Unlike in the first embodiment, in the second embodiment, even when the size of the icon selection area 3 is changed, the size of the icon 2 displayed on the screen 9 is kept constant. Therefore, even when the size of the icon selection area 3 changes proportionally or exponentially, the size of the icon 2 does not increase or decrease at a short cycle to impair visibility. As a result, the second embodiment bears the same effect even when the size of the icon selection area 3 increases stepwise, proportionally, or exponentially in accordance with the level of the shake amount.

Third Embodiment

Next, a third embodiment of the present invention will be described.

In the third embodiment, the change judgment timing (change timing) of the size of the icon selection area 3 is different from those of the above embodiments. Thus, that point will mainly be described.

Figure 11:
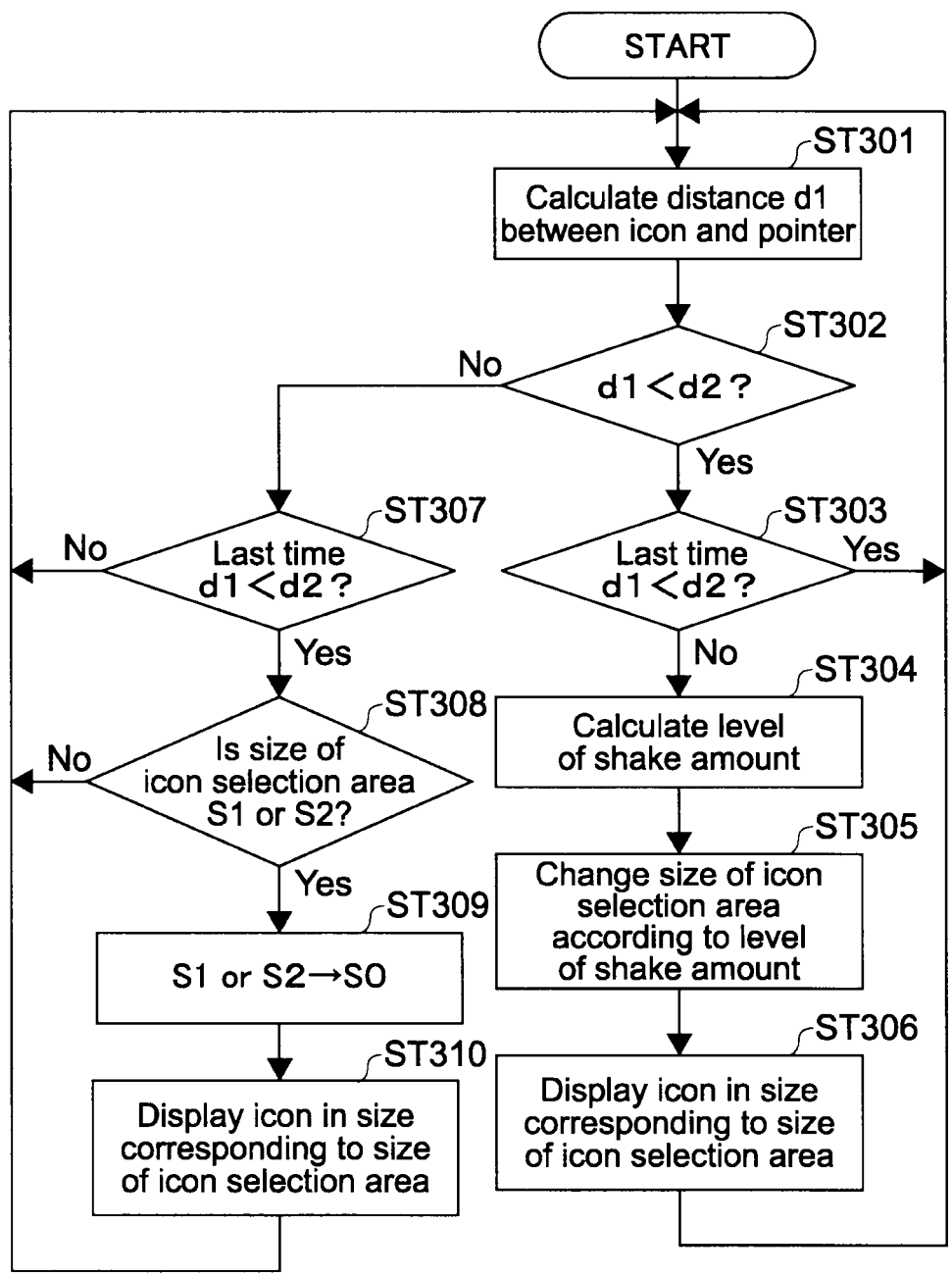
FIG. 11 is a flowchart showing processing of the control apparatus according to still another embodiment of the present invention.

FIG. 11 is a flowchart showing processing of the control apparatus 50 according to the third embodiment.

Figure 12A:
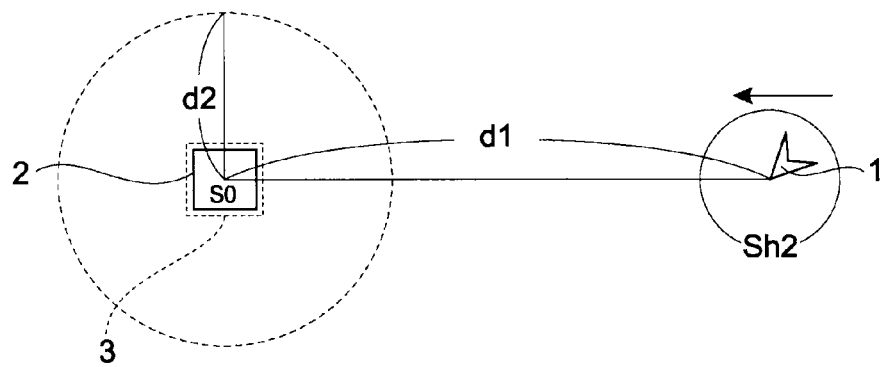
FIG. 12 are diagrams showing an example of a movement of the pointer and a change of the size of the icon selection area that corresponds to the movement of the pointer in a case where the processing shown in FIG. 11 is executed.

FIG. 12 are diagrams showing an example of the movement of the pointer 1 and a change of the size of the icon selection area 3 (icon 2) that corresponds to the movement of the pointer 1 in a case where the processing shown in FIG. 11 is executed.

The CPU 51 of the control apparatus 50 calculates a distance d1 between the icon 2 and the pointer 1 based on the positional coordinates of the icon 2 and the positional coordinates of the pointer 1 (Step 301).

Next, the CPU 51 judges whether the distance d1 between the icon 2 and the pointer 1 is smaller than a comparative distance d2 (Step 302). The comparative distance d2 is typically a specific distance. The comparative distance d2 is set as appropriate in consideration of a maximum size of the icon selection area 3 and the like.

When the distance d1 between the icon 2 and the pointer 1 is smaller than the comparative distance d2 (YES in Step 302), the CPU 51 reads out the result of the last judgment of Step 302 from the storage portion. Then, based on the last judgment result of Step 302, the CPU 51 judges whether the distance d1 between the icon 2 and the pointer 1 is smaller than the comparative distance d2 (Step 303).

When the distance d1 between the icon 2 and the pointer 1 is smaller than the comparative distance d2 in the last judgment (YES in Step 303), the CPU 51 returns to Step 301 and calculates the distance d1 between the icon 2 and the pointer 1 again.

On the other hand, when the distance d1 between the icon 2 and the pointer 1 is equal to or larger than the comparative distance d2 in the last judgment (NO in Step 303) (see FIG. 12B), the CPU 51 calculates the level of the shake amount based on the past trajectories of the pointer 1 (Step 304).

Upon calculating the level of the shake amount, the CPU 51 next changes the size of the icon selection area 3 in accordance with the level of the shake amount (Step 305). In this case, as shown in FIG. 5, the size of the icon selection area 3 is changed to increase stepwise as the level of the shake amount increases.

Next, the display control portion 56 controls display of the pointer 1 so that the icon 2 is displayed in a size corresponding to the icon selection area 3 on the screen 9 (Step 306).

Figure 12B:
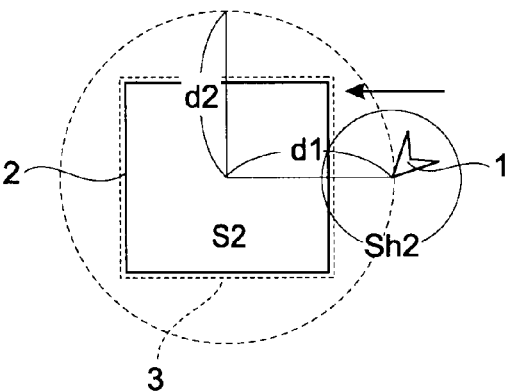

It should be noted that FIG. 12B shows a state where the distance d1 between the icon 2 and the pointer 1 falls below the comparative distance d2 from when it is above the comparative distance d2 and the size of the icon selection area 3 changes from S0 to S2 at the time the level of the shake amount is Sh2.

When the distance d1 between the icon 2 and the pointer 1 is equal to or larger than the comparative distance d2 in Step 302 (NO in Step 302), the CPU 51 reads out the result of the last judgment of Step 302 from the storage portion. Then, based on the last judgment result of Step 302, the CPU 51 judges whether the distance d1 between the icon 2 and the pointer 1 is smaller than the comparative distance d2 (Step 307).

When the distance d1 between the icon 2 and the pointer 1 is equal to or larger than the comparative distance d2 in the last judgment (NO in Step 307) (see FIG. 12A), the CPU 51 returns to Step 301 and calculates the distance d1 between the icon 2 and the pointer 1 again.

When the distance d1 between the icon 2 and the pointer 1 is smaller than the comparative distance d2 in the last judgment (YES in Step 308) (see FIG. 12C), the CPU 51 judges whether the current size of the icon selection area 3 is S1 or S2 (Step 308).

When the size of the icon selection area 3 is not S1 nor S2 (NO in Step 308), that is, the size of the icon selection area 3 is S0, the CPU 51 returns to Step 301 again.

On the other hand, when the size of the icon selection area 3 is S1 or S2 (YES in Step 308), the size of the icon selection area 3 is changed from S1 or S2 to S0 (Step 309). After the size of the icon selection area 3 is changed from S1 or S2 to S0, the display control portion 56 displays the icon 2 in a size corresponding to the icon selection area 3 (S0) on the screen 9 (Step 310).

When the icon 2 is displayed in a size corresponding to the icon selection area 3 (S0) on the screen 9, the CPU 51 returns to Step 301 again.

Figure 12C:
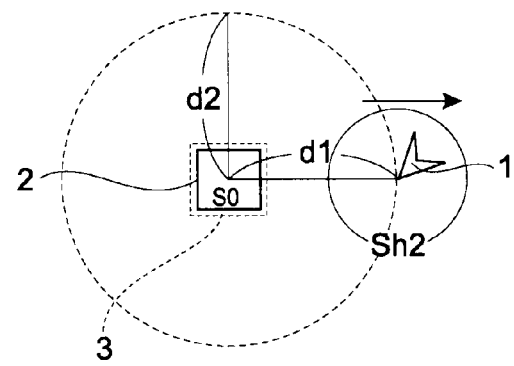

It should be noted that FIG. 12C shows a state where the distance d1 between the icon 2 and the pointer 1 exceeds the comparative distance d2 from when it is below the comparative distance d2 and the size of the icon selection area 3 changes from S2 to S0 at the time the level of the shake amount is Sh2.

In the third embodiment, the level of the shake amount is calculated at a timing the pointer 1 approaches the icon 2 on the screen 9 and the distance d1 between the icon 2 and the pointer 1 falls below the comparative distance d2 from the state where it is equal to or larger than the comparative distance d2, and the size of the icon selection area 3 is also changed at that timing. By thus calculating the level of the shake amount and changing the size of the icon selection area 3 at such a timing, the size of the icon selection area 3 can be made an appropriate size corresponding to the level of the shake amount.

Although the third embodiment has described a case where the size of the icon selection area 3 increases stepwise as the level of the shake amount increases, the size of the icon selection area 3 may increase proportionally or exponentially as the level of the shake amount increases.

Moreover, although the third embodiment has described a case where the size of the icon 2 displayed on the screen 9 corresponds to the size of the icon selection area 3, the size of the icon 2 may be constant at, for example, S0. In this case, as described above in the second embodiment, the processing of displaying the icon 2 displayed on the screen 9 with an emphasis may be executed when the positional coordinates of the pointer 1 are within the icon selection area 3.

Although the comparative distance d2 is constant in the third embodiment, the comparative distance d2 may be changed based on the level of the shake amount. In this case, the comparative distance d2 changes so as to increase as the level of the shake amount increases. In other words, since the size of the icon selection area 3 changes in accordance with the level of the shake amount, the comparative distance d2 may also be changed in accordance with the level of the shake amount.

Modified Examples

The first and second embodiments above have described that the change timing of the icon selection area 3 (change judgment timing of icon selection area 3) is a timing the screen 9 is drawn once or a plurality of times in accordance with the refresh rate. Moreover, the third embodiment has described that the change timing is a timing the distance d1 between the icon 2 and the pointer 1 falls below the comparative distance d2 from the state where it is equal to or larger than the comparative distance d2 or a timing the distance d1 becomes equal to or larger than the comparative distance d2 from the state where it is below the comparative distance d2. However, the change timing of the icon selection area 3 is not limited to the above embodiments.

For example, the change timing of the icon selection area 3 may be a timing the user operates the operation portion 12 of the input apparatus 10 to instruct to change the icon selection area 3 via the operation portion 12.

In this case, a function for changing the icon selection area 3 is allocated to the button 17 of the input apparatus 10, for example. When the user presses the button 17, information indicating that the button 17 has been pressed is transmitted to the control apparatus 50 from the input apparatus 10. Upon receiving the information, the CPU 51 of the control apparatus 50 only needs to calculate the shake amount of the input apparatus 10 and change the size of the icon selection area 3 in accordance with the level of the shake amount.

Alternatively, the change timing of the icon selection area 3 may be a timing the display structure on the screen 9 changes. Here, the change of the display structure on the screen 9 refers to a case where all or a part of the display on the screen 9 is switched, and the display on the screen 9 before the switch and the display on the screen 9 after the switch differ.

The case where the display structure on the screen 9 changes is a case where the user selects an icon 2 displayed on the screen 9 (e.g., file icon 2) to move to a layer 1 step deeper or a layer 1 step higher. As a result, the display structure on the screen 9 is changed.

In this case, the CPU 51 of the control apparatus 50 only needs to judge whether the display structure of the screen 9 has changed and when the display structure of the screen 9 has changed, calculate the shake amount of the input apparatus 10 and change the size of the icon selection area 3 in accordance with the calculated shake amount. In this case, the size of the icon selection area 3 of the icon 2 displayed on the screen 9 after the display structure is changed is changed in accordance with the level of the shake amount.

Also when the size of the icon selection area 3 is changed at the timings described above, the user can easily select a target icon 2.

The above descriptions have been given on the case where the size of the icon selection area 3 is changed in accordance with the level of the shake amount. However, the present invention is not limited thereto, and a size of characters displayed on the screen 9 may be changed in accordance with the level of the shake amount.

It is also possible to change the positional coordinates of the icon 2 in accordance with the level of the shake amount when the size of the icon selection area 3 is changed.

Figure 13A:
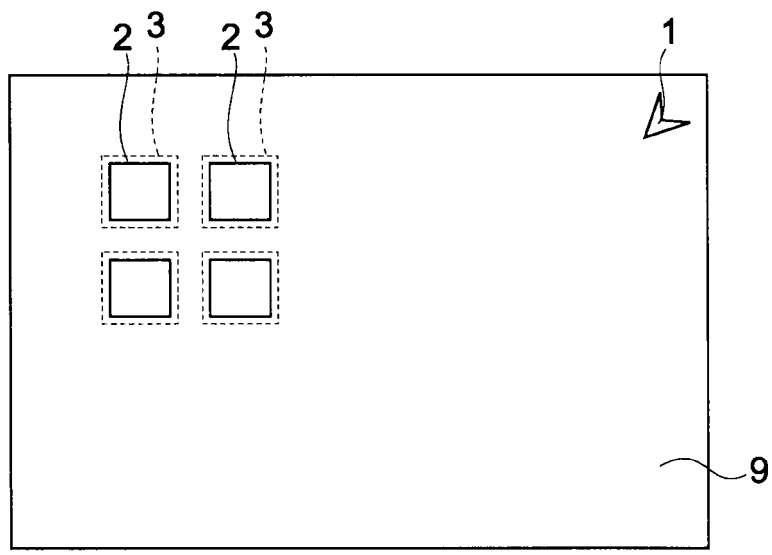
FIG. 13 are diagrams showing an example of a case where positional coordinates of icons are changed in accordance with the change of the size of the icon selection area.

FIGS. 13 and 14 are diagrams each showing an example of a case where the positional coordinates of the icons 2 are changed in accordance with the change of the size of the icon selection area 3.

FIG. 13 show an example of a case where the screen size is changed along with the change of the size of the icon selection area 3 and the positional coordinates of the icons 2.

Figure 13B:
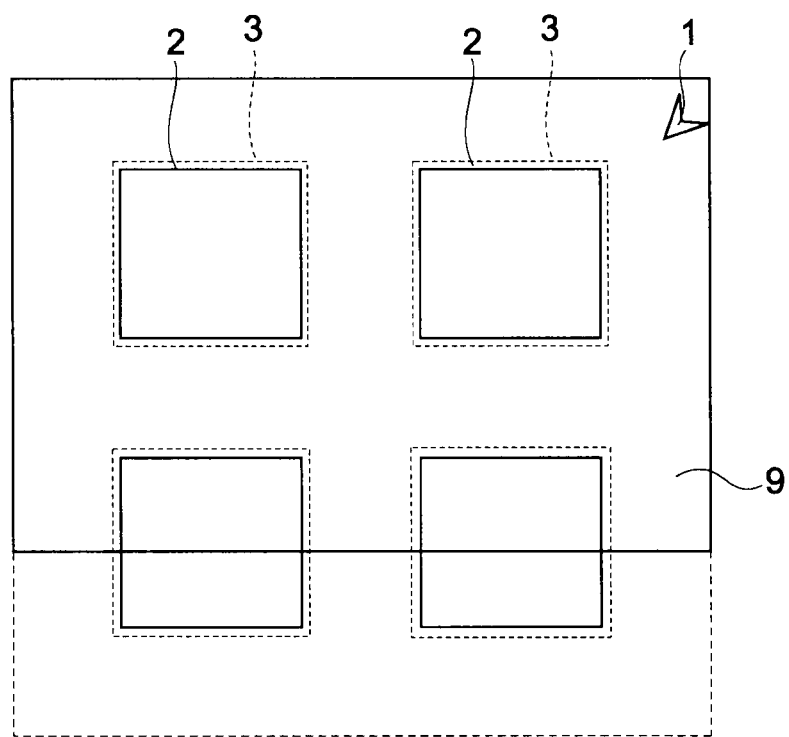

In this case, the CPU 51 of the control apparatus 50 calculates the level of the shake amount of the input apparatus 10 and when the level of the shake amount is equal to or larger than a predetermined threshold value, changes the size of the icon selection area 3, the positional coordinates of the icons 2, and the screen size (see FIG. 13B). It should be noted that the change timing of the size of the icon selection area 3, the positional coordinates of the icons 2, and the screen size may be any of the timings described above.

Since the screen size is larger than the actual size of the screen 9 in the example shown in FIG. 13, the user turns the wheel button 18 to scroll the screen 9.

FIG. 14 show an example of a case where the screen 9 is divided along with the change of the size of the icon selection area 3 and the positional coordinates of the icons 2.

In this case, the CPU 51 of the control apparatus 50 calculates the level of the shake amount of the input apparatus 10. When the level of the shake amount is equal to or larger than a predetermined threshold value, the CPU 51 changes the size of the icon selection area 3 and the positional coordinates of the icons 2 and divides the screen 9 into a plurality of parts (see FIG. 14B). It should be noted that the change timing of the size of the icon selection area 3, the positional coordinates of the icons 2, and the divisional number of screen 9 may be any of the timings described above.

In this case, the user only needs to operate the operation portion 12 of the input apparatus 10 to make a switch among the plurality of screens 9.

In the descriptions above, the image sensor 23 has been taken as an example of a sensor portion used in the input apparatus 10. However, the present invention is not limited thereto, and a motion sensor that detects a movement of the input apparatus 10 (casing 11) may be provided in the input apparatus 10 as the sensor portion. As the motion sensor, an angular velocity sensor, an acceleration sensor, or a velocity sensor is used. Examples of the angular velocity sensor include a vibration-type gyro sensor, a rotary top gyro sensor, a ring laser gyro sensor, a gas rate gyro sensor, and a geomagnetic gyro sensor. Examples of the acceleration sensor include a piezoresistance-type acceleration sensor, a piezoelectric-type acceleration sensor, and a capacitance-type acceleration sensor. Moreover, an example of the velocity sensor is a pitot tube. The motion sensor may be a combination of two or more sensors described above.

Here, when a vibration-type gyro sensor is used as the motion sensor, for example, the level of the shake amount can be detected by using a band pass filter that causes a signal having a frequency within a predetermined frequency range (1 to 20 Hz) to pass.

The above descriptions have been given on the case where the sensor constituting the sensor portion has both the function as a coordinate sensor that outputs a detection signal for generating positional coordinates of the pointer 1 and the function as a shake detection sensor that outputs a detection signal for calculating a level of a shake amount.

However, the present invention is not limited thereto, and the coordinate sensor and the shake detection sensor may be structured as different sensors. In this case, the sensor portion includes those sensors.

As the coordinate sensor, an image sensor that detects relative positions of the input apparatus 10 and the display apparatus 60, a motion sensor that detects a movement of the input apparatus 10, or the like is used.

As the shake detection sensor, an image sensor, a motion sensor, or the like can be used.

When the shake of the input apparatus 10 is extremely large, the control system may switch the way of inputting the movement of the pointer 1 from a 3-dimensional operation of the input apparatus 10 to an input using the arrow key 19 of the input apparatus 10, for example.

The present invention is applicable to a handheld apparatus including a display portion provided with the screen 9 and a sensor portion. Examples of the handheld apparatus include a PDA (Personal Digital Assistance), a cellular phone, a portable music player, and a digital camera.

The sensor portion of the handheld apparatus may be constituted of a sensor having both the function as a coordinate sensor and the function as a shake detection sensor. An example of such a sensor having both functions is a motion sensor.

When the motion sensor is used, at a time the user operates the handheld apparatus 3-dimensionally, a 3-dimensional movement of the handheld apparatus is detected by the motion sensor, and the pointer 1 displayed on the screen 9 moves in accordance with the 3-dimensional operation. In addition, the size of the icon selection area 3 is changed in accordance with the level of the shake amount calculated based on the detection signal output by the motion sensor.

Also in this case, since the size of the icon selection area 3 is changed in accordance with the level of the shake amount, the user can easily select a target icon 2 even when a shake is caused.

The coordinate sensor and the shake detection sensor may be structured as different sensors. In this case, the sensor portion includes those sensors.

Example of the coordinate sensor include a motion sensor that detects a movement of the handheld apparatus and various touch sensors that are used in touch panels of a resistance film type, a capacitance type, an electromagnetic induction type, an ultrasonic surface acoustic wave type, and an infrared operation type.

Examples of the shake detection sensor include an image sensor and a motion sensor.

As an example, a case where a touch sensor is used as the coordinate sensor and a motion sensor is used as the shake detection sensor will be described. In this case, by the user touching the screen 9 of the display portion of the handheld apparatus with a finger or a touch pen, the touched position is detected by the touch sensor, and the pointer 1 moves on the screen 9. Further, the size of the icon selection area 3 is changed in accordance with the level of the shake amount calculated based on the detection signal detected by the motion sensor.

Also in such a case, since the size of the icon selection area 3 is changed in accordance with the level of the shake amount, the user can easily select a target icon 2 even when a shake is caused.

The present application contains subject matter related to that disclosed in Japanese Priority Patent Application JP 2010-127513 filed in the Japan Patent Office on Jun. 3, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A control system, comprising:
an input apparatus including a sensor portion; and
circuitry configured to:
generate, based on a detection signal detected by the sensor portion and received from the sensor portion by the circuitry, positional coordinates of a pointer on a screen,
change, in accordance with a level of a shake amount calculated based on the detection signal, a size of an icon selection area, relative to the positional coordinates of the pointer on the screen, as an area where an icon on the screen is selected by the pointer, and
control display on the screen so that the pointer is displayed at a position corresponding to the positional coordinates of the pointer.

2. The control system according to claim 1, wherein the circuitry is configured to change the size of the icon selection area at a predetermined timing.

3. The control system according to claim 2, wherein the circuitry is configured to change the size of the icon selection area at one of a timing at which the pointer approaches the icon and a timing at which the pointer moves away from the icon.

4. The control system according to claim 3, wherein the circuitry is configured to:
calculate a distance between the icon and the pointer based on the positional coordinates of the icon and the pointer,
judge whether the distance between the icon and the pointer is smaller than a comparative distance, and
change the size of the icon selection area at one of a timing at which the distance between the icon and the pointer falls below the comparative distance from a state where the distance is equal to or larger than the comparative distance and a timing at which the distance becomes equal to or larger than the comparative distance from a state where the distance is below the comparative distance.

5. The control system according to claim 2, wherein the circuitry is configured to change the size of the icon selection area every time the screen is drawn at least once at a refresh rate timing of the screen.

6. The control system according to claim 2,
wherein the input apparatus includes an operation portion, and
wherein the circuitry is configured to change the size of the icon selection area at a timing at which a user instructs to change the size of the icon selection area via the operation portion.

7. The control system according to claim 2, wherein the circuitry is configured to change the size of the icon selection area at a timing at which a display structure on the screen changes.

8. The control system according to claim 1, wherein the circuitry is configured to display, in accordance with the change of the size of the icon selection area, an icon that is of a size corresponding to the icon selection area on the screen.

9. The control system according to claim 1, wherein the circuitry is configured to display an icon of a certain size on the screen irrespective of whether the size of the icon selection area is changed.

10. The control system according to claim 9, wherein the circuitry is configured to:
judge whether the positional coordinates of the pointer are within the icon selection area, and
display the icon with an emphasis when the positional coordinates of the pointer are within the icon selection area.

11. The control system according to claim 1, wherein the circuitry is configured to change, when the size of the icon selection area is changed, the positional coordinates of the icon in accordance with the level of the shake amount.

12. A control apparatus that controls display on a screen based on a detection signal detected by a sensor portion of an input apparatus, comprising:

circuitry configured to generate, based on the detection signal received from the sensor portion by the circuitry, positional coordinates of a pointer on the screen;

change, in accordance with a level of a shake amount calculated based on the detection signal, a size of an icon selection area, relative to the positional coordinates of the pointer on the screen, as an area where an icon on the screen is selected by the pointer; and display on the screen so that the pointer is displayed at a position corresponding to the positional coordinates of the pointer.

13. A handheld apparatus, comprising:

a display portion including a screen;

a sensor portion; and circuitry configured to generate, based on a detection signal detected by the sensor portion and received from the sensor portion by the circuitry, positional coordinates of a pointer on the screen;

change, in accordance with a level of a shake amount calculated based on the detection signal, a size of an icon selection area, relative to the positional coordinates of the pointer on the screen, as an area where an icon on the screen is selected by the pointer; and control display on the screen so that the pointer is displayed at a position corresponding to the positional coordinates of the pointer.

14. A control method, comprising:

generating, based on a detection signal detected by a sensor portion and received from the sensor portion by a processor, using the processor, positional coordinates of a pointer on a screen;

changing, in accordance with a level of a shake amount calculated based on the detection signal, using the processor, a size of an icon selection area as an area, relative to the positional coordinates of the pointer on the screen, where an icon on the screen is selected by the pointer; and controlling display on the screen so that the pointer is displayed at a position corresponding to the positional coordinates of the pointer.

15. A non-transitory computer-readable storage medium storing computer-readable instructions that, when executed by a computer, cause the computer to perform a method comprising:

generating, based on a detection signal detected by a sensor portion and received by the computer, positional coordinates of a pointer on a screen;

changing, in accordance with a level of a shake amount calculated based on the detection signal, a size of an icon selection area as an area, relative to the positional coordinates of the pointer on the screen, where an icon on the screen is selected by the pointer; and controlling display on the screen so that the pointer is displayed at a position corresponding to the positional coordinates of the pointer.

* * * * *